US012592084B2

(12) United States Patent
Kobori et al.

(10) Patent No.: US 12,592,084 B2
(45) Date of Patent: Mar. 31, 2026

(54) APPARATUS, METHOD, AND COMPUTER PROGRAM FOR IDENTIFYING STATE OF LIGHTING

(71) Applicant: TOYOTA JIDOSHA KABUSHIKI KAISHA, Toyota (JP)

(72) Inventors: Norimasa Kobori, Tokyo-to (JP); Hitoshi Kamada, Kawasaki (JP); Yushi Nagata, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 601 days.

(21) Appl. No.: 17/980,184

(22) Filed: Nov. 3, 2022

(65) Prior Publication Data

US 2023/0177844 A1 Jun. 8, 2023

(30) Foreign Application Priority Data

Dec. 8, 2021 (JP) ................................. 2021-199535

(51) Int. Cl.
*G06V 20/58* (2022.01)
*G06V 10/764* (2022.01)
*G06V 10/77* (2022.01)

(52) U.S. Cl.
CPC .......... *G06V 20/584* (2022.01); *G06V 10/764* (2022.01); *G06V 10/7715* (2022.01)

(58) Field of Classification Search
CPC ............... G06V 20/584; G06V 10/764; G06V 10/7715; G06V 20/58; G06V 10/82; Y02B 20/40; G06N 3/08
See application file for complete search history.

(56) References Cited

U.S. PATENT DOCUMENTS 6,705,745 B1 * 3/2004 Pederson ............. B60Q 1/2611
                                                        362/800
2010/0226578 A1    9/2010 Kokojima
2017/0371347 A1 * 12/2017 Cohen .................. G06V 20/586
(Continued)

FOREIGN PATENT DOCUMENTS

CN        112651395 A      4/2021
CN        113492750 A     10/2021
(Continued)

*Primary Examiner* — Jennifer Mehmood
*Assistant Examiner* — Dustin Bilodeau
(74) *Attorney, Agent, or Firm* — OLIFF PLC.

(57) ABSTRACT

An apparatus for identifying the state of lighting includes a processor configured to identify the states of lighting of a first lighting part and a second lighting part of a vehicle by inputting time-series images representing the vehicle into a classifier. The classifier includes a feature calculation part configured to calculate a feature map whenever one of the time-series images is inputted in chronological order; a first state-of-lighting identification part including a recursive structure and configured to identify the state of lighting of the first lighting part while updating a first internal state by inputting the feature map calculated for each of the time-series images in chronological order; and a second state-of-lighting identification part including a recursive structure and configured to identify the state of lighting of the second lighting part while updating a second internal state by inputting the feature map in chronological order.

3 Claims, 5 Drawing Sheets

(56)            References Cited

U.S. PATENT DOCUMENTS

| | | | |
|---|---|---|---|
| 2018/0336692 | A1 | 11/2018 | Wendel et al. |
| 2019/0339707 | A1 | 11/2019 | Chen et al. |
| 2021/0312198 | A1 | 10/2021 | Hashimoto |
| 2022/0058453 | A1* | 2/2022 | Malach .................. G06F 18/24 |

FOREIGN PATENT DOCUMENTS

| | | | |
|---|---|---|---|
| JP | 2010-140315 | A | 6/2010 |
| JP | 2010-204947 | A | 9/2010 |
| JP | 2010-224787 | A | 10/2010 |
| JP | 2018-124801 | A | 8/2018 |
| JP | 2020-015504 | A | 1/2020 |
| JP | 2020-042786 | A | 3/2020 |
| JP | 2020-522907 | A | 7/2020 |
| JP | 2021-163432 | A | 10/2021 |
| WO | 2018/132607 | A2 | 7/2018 |

* cited by examiner

FIG. 3

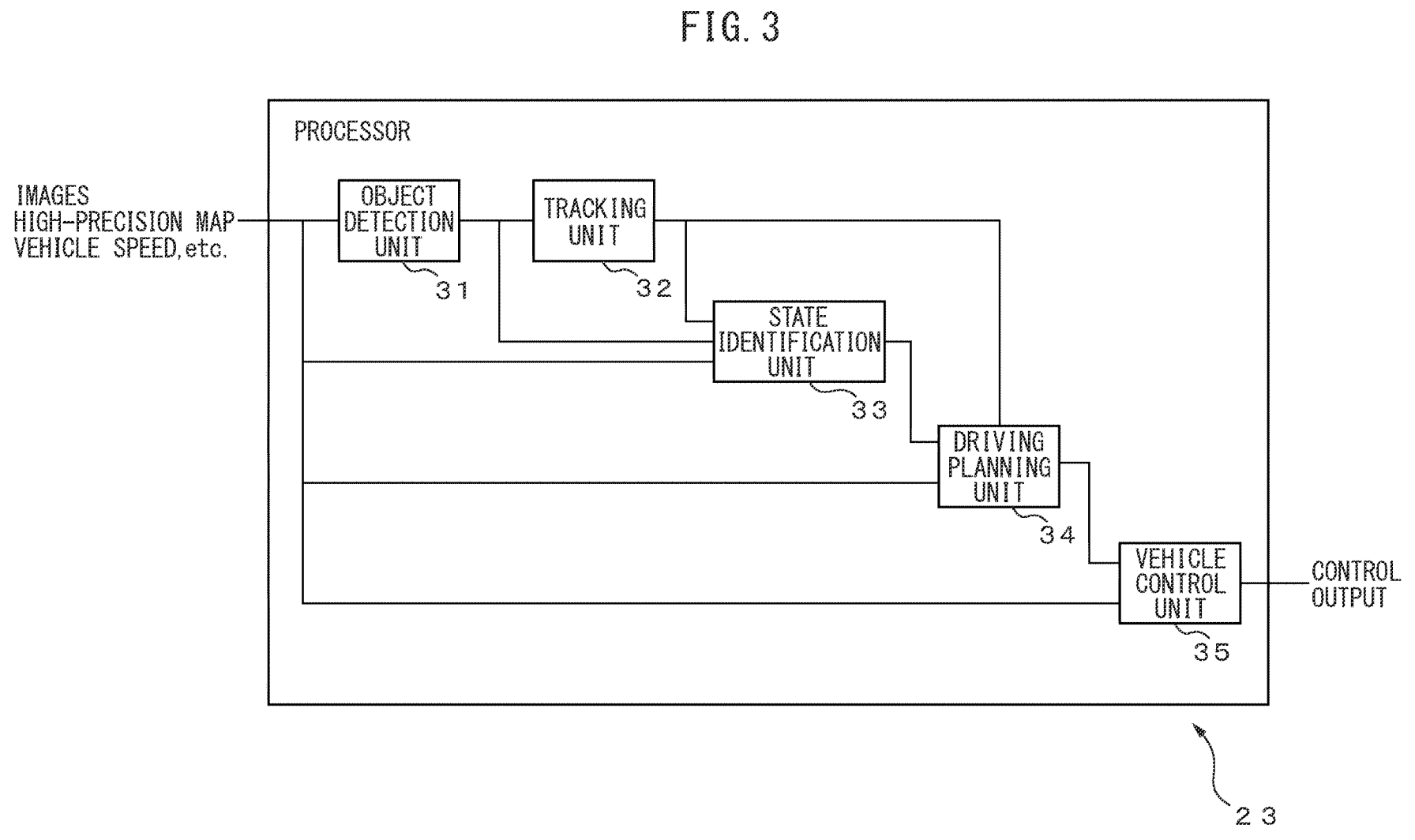

PROCESSOR

IMAGES
HIGH-PRECISION MAP
VEHICLE SPEED, etc.

OBJECT
DETECTION
UNIT
31

TRACKING
UNIT
32

STATE
IDENTIFICATION
UNIT
33

DRIVING
PLANNING
UNIT
34

VEHICLE
CONTROL
UNIT
35

CONTROL
OUTPUT

Figure 5:
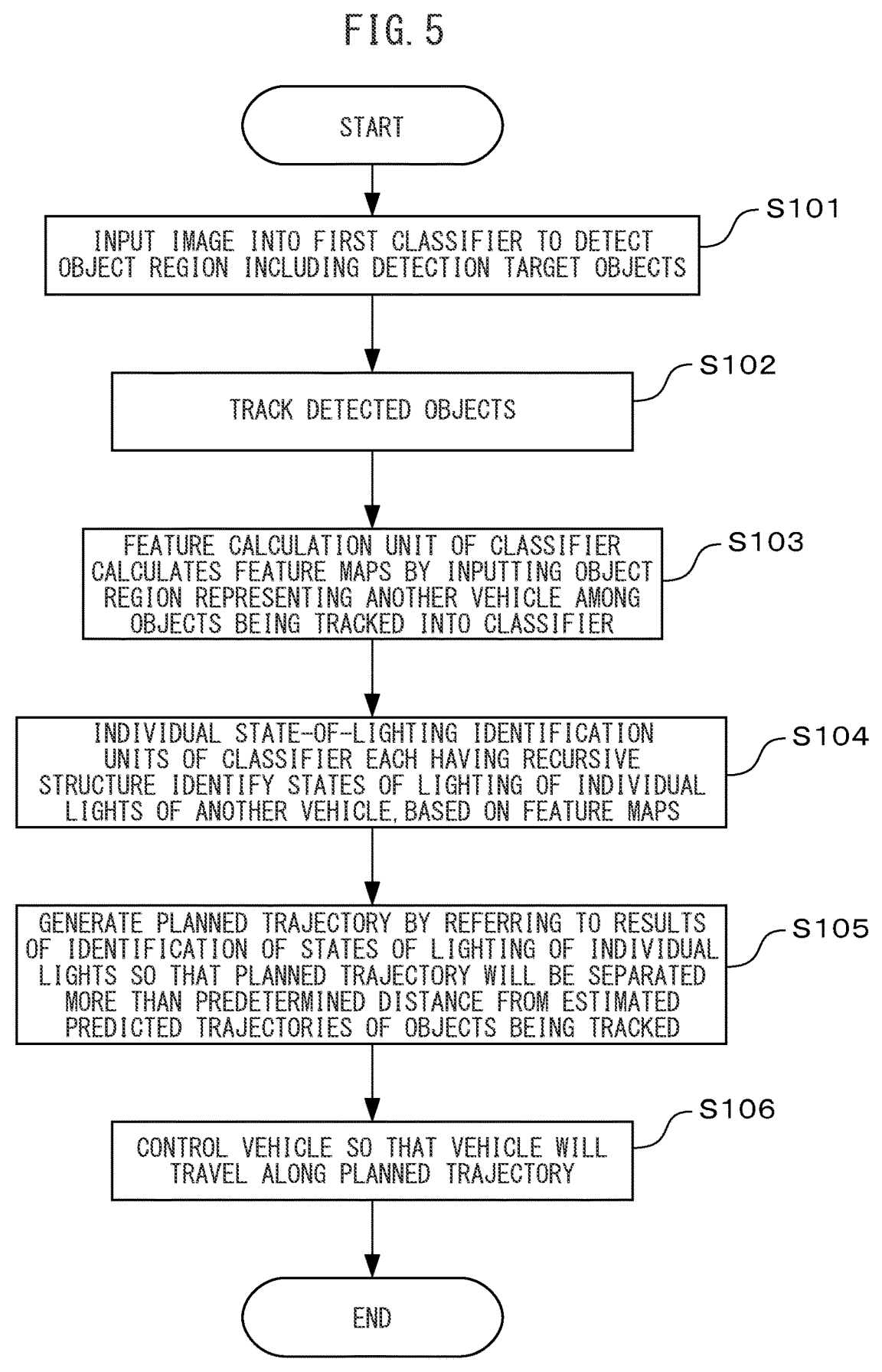

START

INPUT IMAGE INTO FIRST CLASSIFIER TO DETECT
OBJECT REGION INCLUDING DETECTION TARGET OBJECTS                    S101

TRACK DETECTED OBJECTS                    S102

FEATURE CALCULATION UNIT OF CLASSIFIER
CALCULATES FEATURE MAPS BY INPUTTING OBJECT
REGION REPRESENTING ANOTHER VEHICLE AMONG
OBJECTS BEING TRACKED INTO CLASSIFIER                    S103

INDIVIDUAL STATE-OF-LIGHTING IDENTIFICATION
UNITS OF CLASSIFIER EACH HAVING RECURSIVE
STRUCTURE IDENTIFY STATES OF LIGHTING OF INDIVIDUAL
LIGHTS OF ANOTHER VEHICLE, BASED ON FEATURE MAPS                    S104

GENERATE PLANNED TRAJECTORY BY REFERRING TO RESULTS
OF IDENTIFICATION OF STATES OF LIGHTING OF INDIVIDUAL
LIGHTS SO THAT PLANNED TRAJECTORY WILL BE SEPARATED
MORE THAN PREDETERMINED DISTANCE FROM ESTIMATED
PREDICTED TRAJECTORIES OF OBJECTS BEING TRACKED                    S105

CONTROL VEHICLE SO THAT VEHICLE WILL
TRAVEL ALONG PLANNED TRAJECTORY                    S106

END

APPARATUS, METHOD, AND COMPUTER PROGRAM FOR IDENTIFYING STATE OF LIGHTING

FIELD

The present invention relates to an apparatus, a method, and a computer program for identifying the state of lighting of a light provided on a vehicle.

BACKGROUND

To control a vehicle for autonomous driving or assist a driver in driving a vehicle, it is preferable that the motion of other traveling vehicles around the vehicle can be predicted. Thus, techniques to detect, in particular, the state of lighting of a light provided on a vehicle from those images obtained by a camera mounted on a host vehicle which represent the surroundings of the host vehicle have been proposed (see Japanese Unexamined Patent Publications JP2020-042786A and JP2020-015504A).

JP2020-042786A discloses that a target region image is processed using a deep learning model, and a state parameter of an automobile in the target area image is outputted, and that such a state parameter includes a brake light state and a turn signal state.

JP2020-015504A discloses that a brake light identification module identifies at least one brake light associated with a target vehicle, based on analysis of multiple images. The brake light identification module can use one or more neural networks. JP2020-015504A also discloses that an emergency light associated with a vehicle is detected in at least one image.

SUMMARY

A vehicle is provided with multiple lights for indicating its motion, such as brake lights and direction indicators. To predict the motion of a vehicle correctly, it is preferable that the states of lighting of the respective lights can be identified. However, if classifiers to identify the state of lighting were provided on a light-by-light basis, the amount of computation would increase. Under the conditions that only limited hardware resources can be used, e.g., in the case of a vehicle-mounted processor, it is desirable to identify the states of lighting of lights provided on a vehicle with a reduced amount of computation.

It is an object of the present invention to provide an apparatus that can accurately identify the states of lighting of lights provided on a vehicle with a reduced amount of computation.

According to an embodiment, an apparatus for identifying the state of lighting is provided. The apparatus includes a processor configured to identify the states of lighting of a first lighting part and a second lighting part of a vehicle by inputting time-series images representing the vehicle into a classifier. The classifier includes a feature calculation part configured to calculate, whenever one of the time-series images is inputted in chronological order, a feature map representing features of the first lighting part and the second lighting part by executing a convolution operation on the inputted image. The classifier further includes a first state-of-lighting identification part including a recursive structure and configured to identify the state of lighting of the first lighting part while updating a first internal state that is recursively used by inputting the feature map calculated for each of the time-series images in chronological order. The classifier further includes a second state-of-lighting identification part including a recursive structure and configured to identify the state of lighting of the second lighting part while updating a second internal state that is recursively used by inputting the feature map calculated for each of the time-series images in chronological order.

The processor is preferably further configured to detect an object region representing the vehicle from each of the time-series images; and track the vehicle to associate object regions representing the vehicle in the respective time-series images with each other. The processor preferably inputs the object regions representing the vehicle being tracked in the respective time-series images into the classifier.

In the apparatus, the first lighting part is preferably a direction indicator, and the second lighting part is preferably a rotating light.

According to another embodiment, a method for identifying the state of lighting is provided. The method includes identifying the states of lighting of a first lighting part and a second lighting part of a vehicle by inputting time-series images representing the vehicle into a classifier including a feature calculation part, a first state-of-lighting identification part including a recursive structure, and a second state-of-lighting identification part including a recursive structure. The feature calculation part of the classifier calculates, whenever one of the time-series images is inputted in chronological order, a feature map representing features of the first lighting part and the second lighting part by executing a convolution operation on the inputted image. The first state-of-lighting identification part of the classifier identifies the state of lighting of the first lighting part while updating a first internal state that is recursively used by inputting the feature map calculated for each of the time-series images in chronological order. The second state-of-lighting identification part of the classifier identifies the state of lighting of the second lighting part while updating a second internal state that is recursively used by inputting the feature map calculated for each of the time-series images in chronological order.

According to still another embodiment, a non-transitory recording medium that stores a computer program for identifying the state of lighting is provided. The computer program includes instructions causing a computer to execute a process including identifying the states of lighting of a first lighting part and a second lighting part of a vehicle by inputting time-series images representing the vehicle into a classifier including a feature calculation part, a first state-of-lighting identification part including a recursive structure, and a second state-of-lighting identification part including a recursive structure. The feature calculation part of the classifier calculates, whenever one of the time-series images is inputted in chronological order, a feature map representing features of the first lighting part and the second lighting part by executing a convolution operation on the inputted image. The first state-of-lighting identification part of the classifier identifies the state of lighting of the first lighting part while updating a first internal state that is recursively used by inputting the feature map calculated for each of the time-series images in chronological order. The second state-of-lighting identification part of the classifier identifies the state of lighting of the second lighting part while updating a second internal state that is recursively used by inputting the feature map calculated for each of the time-series images in chronological order.

The apparatus according to the present disclosure has an advantageous effect of being able to accurately identify the states of lighting of lights provided on a vehicle with a reduced amount of computation.

BRIEF DESCRIPTION OF DRAWINGS

FIG. 3 is a functional block diagram of a processor of the electronic control unit, related to a vehicle control process including a state-of-lighting identification process.

FIG. 5 is an operation flowchart of the vehicle control process including the state-of-lighting identification process.

DESCRIPTION OF EMBODIMENTS

An apparatus for identifying the state of lighting, a method therefor executed by the apparatus, and a computer program therefor will now be described with reference to the attached drawings. The apparatus identifies the states of lighting of multiple lights of a vehicle represented in time-series images. To identify the states of lighting of the respective lights, the apparatus uses a single classifier. The classifier includes a feature calculation unit that calculates feature maps representing features of the respective lights by executing a convolution operation on an inputted image whenever one of the time-series images is inputted in chronological order; and two or more state-of-lighting identification units prepared separately for different types of lights. Each state-of-lighting identification unit, which has a recursive structure and into which the feature maps respectively calculated for the time-series images are inputted in chronological order, identifies the state of lighting of a target light for identification while updating an internal state that is recursively used. In this way, the apparatus uses the common feature calculation unit for calculating feature maps representing features of the respective lights to prevent the configuration of the classifier from upsizing, thereby reducing the amount of computation. Additionally, the apparatus includes in the classifier the separate units for identifying the states of lighting of the individual lights on the basis of the calculated common feature maps, thereby enabling accurate identification of the states of lighting of the individual lights.

In the present embodiment, the target lights for identification of the states of lighting include, for example, brake lights, direction indicators, and a rotating light, but are not limited thereto.

The following describes an example in which the apparatus for identifying the state of lighting is applied to a vehicle control system. In this example, the apparatus executes a state-of-lighting identification process on time-series images obtained by a camera mounted on a vehicle to identify the states of lighting of individual lights provided on other vehicles around the vehicle.

Figure 1:
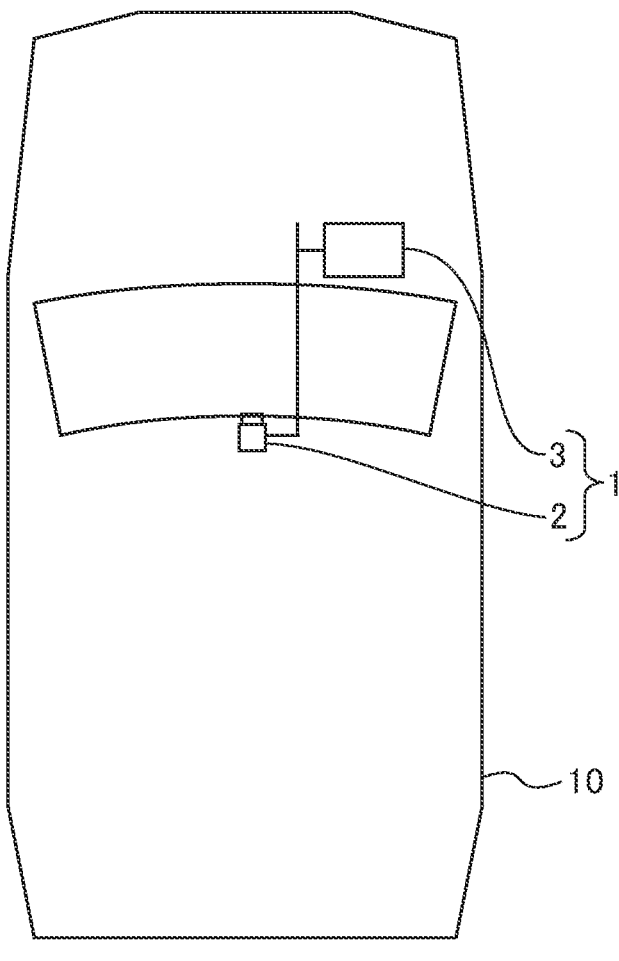
FIG. 1 schematically illustrates the configuration of a vehicle control system equipped with an apparatus for identifying the state of lighting.
Figure 2:
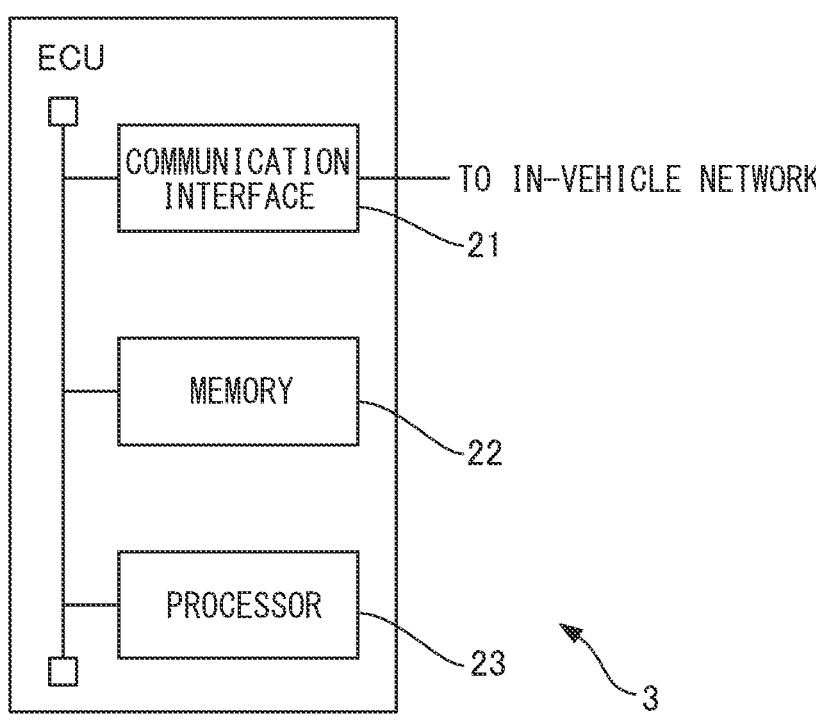
FIG. 2 illustrates the hardware configuration of an electronic control unit, which is an embodiment of the apparatus for identifying the state of lighting.

FIG. 1 schematically illustrates the configuration of a vehicle control system equipped with the apparatus for identifying the state of lighting. FIG. 2 illustrates the hardware configuration of an electronic control unit, which is an embodiment of the apparatus for identifying the state of lighting. In the present embodiment, the vehicle control system 1, which is mounted on a vehicle 10 and controls the vehicle 10, includes a camera 2 for capturing the surroundings of the vehicle 10, and an electronic control unit (ECU) 3, which is an example of the apparatus for identifying the state of lighting. The camera 2 is communicably connected to the ECU 3 via an in-vehicle network conforming to a standard such as a controller area network. The vehicle control system 1 may further include a storage device that stores a map used for autonomous driving control of the vehicle 10; a range sensor, such as LiDAR or radar; and a GPS receiver or another receiver for determining the position of the vehicle 10 in conformity with a satellite positioning system. The vehicle control system 1 may further include a wireless terminal for wireless communication with another device; and a navigation device for searching for a planned travel route of the vehicle 10.

The camera 2, which is an example of an image capturing unit that generates images representing the surroundings of the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented to the front of the vehicle 10. The camera 2 captures a region in front of the vehicle 10 every predetermined capturing period (e.g., 1/30 to 1/10 seconds), and generates images representing this region. The images obtained by the camera 2 are preferably color images. The vehicle 10 may include multiple cameras taking pictures in different orientations or having different focal lengths. For example, a camera that captures a region behind the vehicle 10 may be provided separately from the camera 2, which captures a region in front of the vehicle 10.

Whenever an image is generated, the camera 2 outputs the image to the ECU 3 via the in-vehicle network.

The ECU 3 controls the vehicle 10. In the present embodiment, the ECU 3 controls the vehicle 10 to automatically drive the vehicle 10, based on objects detected from time-series images obtained by the camera 2. To achieve this, the ECU 3 includes a communication interface 21, a memory 22, and a processor 23.

The communication interface 21, which is an example of a communication unit, includes an interface circuit for connecting the ECU 3 to the in-vehicle network. In other words, the communication interface 21 is connected to the camera 2 via the in-vehicle network. Whenever an image is received from the camera 2, the communication interface 21 passes the image to the processor 23.

The memory 22, which is an example of a storage unit, includes, for example, volatile and nonvolatile semiconductor memories, and stores various types of data and various parameters used in the state-of-lighting identification process executed by the processor 23 of the ECU 3. For example, the memory 22 stores images received from the camera 2 and a set of parameters for defining classifiers used in the state-of-lighting identification process. Additionally, the memory 22 stores various types of data generated during the state-of-lighting identification process, such as internal states of a classifier, for a certain period. The memory 22 may further store information used for travel control of the vehicle 10, e.g., a high-precision map representing features that affect travel of the vehicle 10, such as lane-dividing lines.

The processor 23, which is an example of a control unit, includes one or more central processing units (CPUs) and a peripheral circuit thereof. The processor 23 may further include another operating circuit, such as a logic-arithmetic unit, an arithmetic unit, or a graphics processing unit (GPU).

During travel of the vehicle 10, the processor 23 executes a vehicle control process including the state-of-lighting identification process on images received from the camera 2, at predetermined intervals. The processor 23 controls the vehicle 10 to automatically drive the vehicle 10, based on detected objects around the vehicle 10.

FIG. 3 is a functional block diagram of the processor 23 of the ECU 3, related to the vehicle control process including the state-of-lighting identification process. The processor 23 includes an object detection unit 31, a tracking unit 32, a state identification unit 33, a driving planning unit 34, and a vehicle control unit 35. These units included in the processor 23 are, for example, functional modules implemented by a computer program executed by the processor 23, or may be dedicated operating circuits provided in the processor 23. Of these units included in the processor 23, the object detection unit 31, the tracking unit 32, and the state identification unit 33 execute the state-of-lighting identification process. In the case that the vehicle 10 includes multiple cameras, the processor 23 may execute the state-of-lighting identification process for each camera, based on images obtained by the camera.

The object detection unit 31, which is an example of the detection unit, inputs the latest image received from the camera 2 into a first classifier for object detection at predetermined intervals. In this way, the object detection unit 31 detects regions including detection targets represented in the image (i.e., object regions) and determines the types of the detection targets.

As the first classifier, for example, a deep neural network (DNN) having architecture of a convolutional neural network (hereafter simply "CNN") type, such as Single Shot MultiBox Detector (SSD) or Faster R-CNN, or a Vision Transformer (ViT) type is used. Such a DNN is trained in advance in accordance with a predetermined training technique, such as backpropagation, with a large number of training images representing detection targets, so as to detect a detection target.

Alternatively, a classifier based on another machine learning technique, such as a support vector machine or AdaBoost, may be used as the first classifier. In this case, while variously changing the position, size, and aspect ratio of a window defined on an image, the object detection unit 31 calculates features, such as histograms of oriented gradients (HOGs), with respect to the window and inputs the calculated features into the first classifier. In this way, the object detection unit 31 determines a confidence score of the window. The object detection unit 31 then determines that a certain type of detection target is represented in a window of which the confidence score of the detection target is not less than a predetermined confidence score threshold, and determines this window as an object region.

The detection targets are traveling vehicles around the vehicle 10. The detection targets may include objects that affect travel control of the vehicle 10, besides vehicles. Examples of such objects include humans, signposts, traffic lights, road markings such as lane-dividing lines, and other objects on roads.

The object detection unit 31 enters the positions and areas of object regions in the image as well as the types of the objects included in the respective object regions, in a detected-object list. The object detection unit 31 stores the detected-object list in the memory 22.

For each object region detected from the latest image, the tracking unit 32 refers to the detected-object list to associate the detection target represented in the object region with a detection target detected from a past image, thereby tracking the detection target represented in the object region. Of the detection targets being tracked, the tracking unit 32 further selects traveling vehicles around the vehicle 10 as target vehicles for identification of the state of lighting.

The tracking unit 32 applies, for example, a tracking process based on optical flow, such as the Lucas-Kanade method, to an object region of interest in the latest image and object regions in past images, thereby tracking the detection target represented in the object regions. To this end, the tracking unit 32 applies, for example, a filter for extracting characteristic points, such as SIFT or Harris operator, to the object region of interest, thereby extracting characteristic points from this object region. The tracking unit 32 then determines those points in the object regions in the past images which correspond to each of the characteristic points in accordance with the applied tracking technique, thereby calculating the optical flow. Alternatively, the tracking unit 32 may apply another tracking technique applied for tracking a moving object detected from an image to the object region of interest in the latest image and the object regions in the past images, thereby tracking the detection target represented in the object regions.

The tracking unit 32 determines a detection target detected from the latest image and associated with none of the detection targets represented in the past images as a new tracking target, and assigns this detection target an identification number different from the identification numbers of the other detection targets being tracked. The tracking unit 32 then enters the assigned identification number in the detected-object list in association with the new tracking target. In contrast, the tracking unit 32 associates a detection target detected from the latest image and associated with a detection target represented in the past images, i.e., one of the detection targets being tracked, with the same identification number as assigned to this tracked detection target.

Of the detection targets being tracked, the tracking unit 32 determines traveling vehicles around the vehicle 10 as targets for identification of the state of lighting, by referring to the types of the detection targets being tracked. The tracking unit 32 may determine all or some of the vehicles being tracked as targets for identification of the state of lighting.

A detection target closer to the vehicle 10 affects driving control of the vehicle 10 more. Thus, of the vehicles being tracked, the tracking unit 32 selects a predetermined number of vehicles in ascending order of distance from the vehicle 10 as targets for identification of the state of lighting. For example, a larger object region is assumed to represent a vehicle closer to the vehicle 10. Thus the tracking unit 32 selects, for example, a predetermined number of vehicles in descending order of size of object regions in the latest image as targets for identification of the state of lighting.

Alternatively, for each vehicle being tracked, the tracking unit 32 may estimate the distance from the vehicle 10 to the tracked vehicle, based on the ratio of the size of the object region representing the tracked vehicle to a reference size, which is the size measured under the assumption that the distance between the tracked vehicle and the vehicle 10 is a predetermined distance. Alternatively, in the case that the vehicle control system 1 includes a range sensor (not illustrated), such as LiDAR or radar, the distance to each vehicle being tracked may be measured with the range sensor. In this case, for example, the distance in the direction from the range sensor corresponding to that direction from the camera 2 which corresponds to the centroid of an object region representing a vehicle of interest in an image is measured as the distance from the vehicle 10 to the vehicle of interest.

The tracking unit 32 then selects a predetermined number of vehicles in ascending order of estimated or measured distance from the vehicle 10 as targets for identification of the state of lighting.

Alternatively, for each lane, the tracking unit 32 may select a predetermined number of vehicles from among the vehicles being tracked, as targets for identification of the state of lighting. For example, of the vehicles traveling on the same lane as the vehicle 10, the tracking unit 32 selects a vehicle assumed to be the closest to the vehicle 10 as a target for identification of the state of lighting. The tracking unit 32 further selects a vehicle assumed to be the closest to the vehicle 10 from each of the left and right lanes or road shoulders adjoining the lane on which the vehicle 10 is traveling as targets for identification of the state of lighting. For example, in the case that the object detecting unit 31 detects lane-dividing lines from the latest image, the tracking unit 32 determines, for each vehicle, the lane on which the vehicle is traveling, based on the positional relationship between the lane-dividing lines and the object region. For example, the tracking unit 32 determines that a vehicle of interest is traveling on the lane sandwiched between two lane-dividing lines located on the respective sides of the bottom of the object region including the vehicle of interest. Additionally, the tracking unit 32 executes processing similar to the above-described selection of targets for identification of the state of lighting for each lane to select the vehicle closest to the vehicle 10 from among the vehicles traveling on the lane as a target for identification of the state of lighting. The tracking unit 32 may select two or more vehicles in ascending order of distance from the vehicle 10 for each lane.

The tracking unit 32 notifies the state identification unit 33 of identification numbers of the target vehicles for identification of the state of lighting.

For each of the vehicles being tracked that are targets for identification of the state of lighting, the state identification unit 33 identifies the states of lighting of individual lights provided on the vehicle at predetermined intervals. Since the state identification unit 33 executes the same processing on each vehicle being tracked, the following describes processing on a single vehicle.

The state identification unit 33 inputs those object regions in the time-series images obtained by the camera 2 during tracking of a vehicle of interest which represent the vehicle of interest into a second classifier in chronological order to identify the states of lighting of individual lights of the vehicle.

Figure 4:
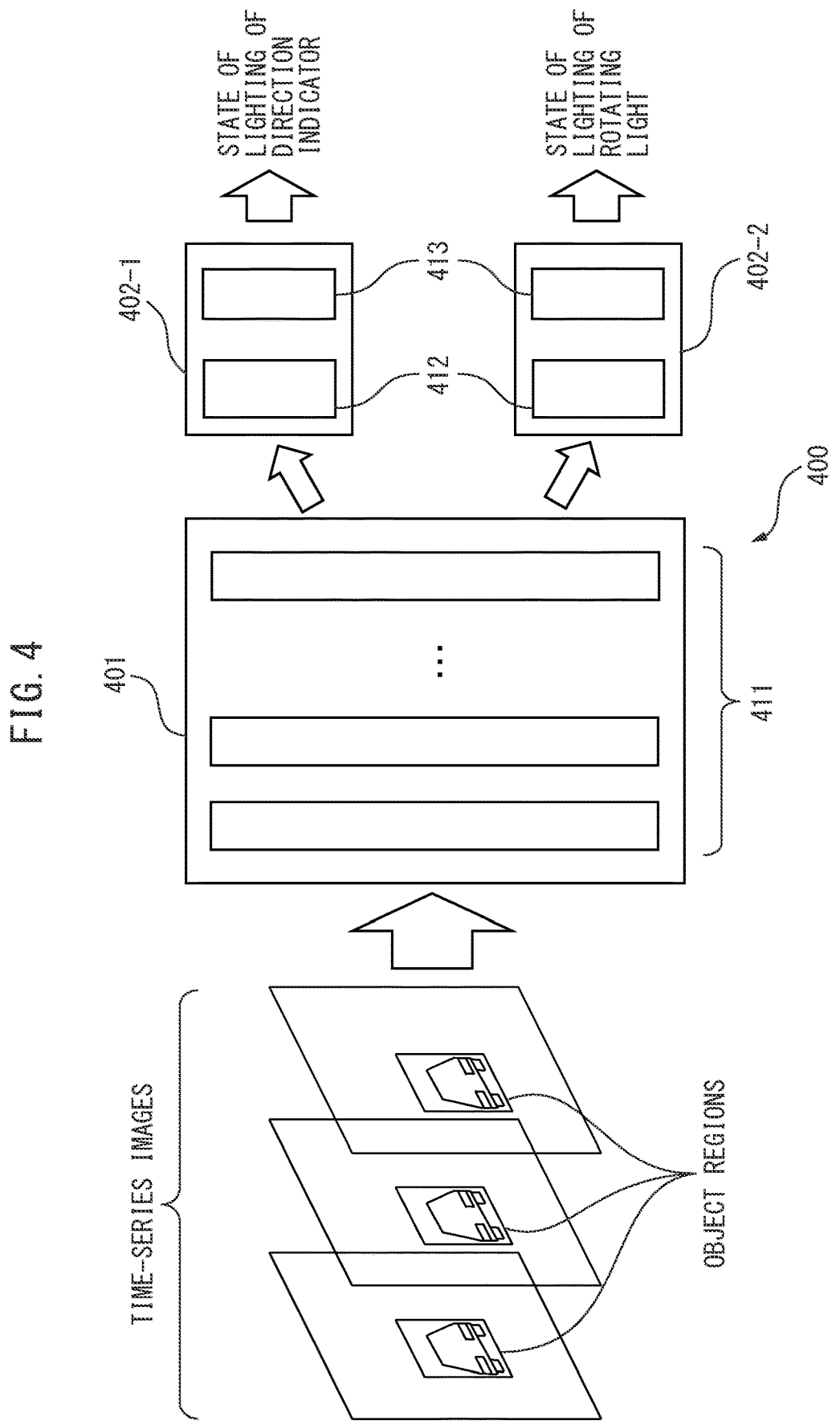
FIG. 4 schematically illustrates the configuration of a second classifier used for identifying the state of lighting.

FIG. 4 schematically illustrates the configuration of the second classifier used for identifying the state of lighting. The second classifier 400 includes a feature calculation unit 401 and two state-of-lighting identification units 402-1 and 402-2.

Whenever an object region in one of the time-series images is inputted in chronological order, the feature calculation unit (feature calculation part) 401 executes a convolution operation on the object region in the image to calculate a feature map representing features of individual lights. To achieve this, the feature calculation unit 401 is configured as a CNN including multiple convolution layers 411 arrayed from the input toward the output. The feature calculation unit 401 may further include an activation layer that executes an activation operation, such as ReLU, between adjacent convolution layers 411. The feature calculation unit 401 may further include a pooling layer that executes a pooling operation between two of the convolution layers 411. In this way, feature maps of different resolutions are obtained for a single object region.

The state identification unit 33 may execute scale transformation, such as downsampling, upsampling, bi-linear interpolation, or bi-cubic interpolation, on each object region in the time-series images to resize the object region to a predetermined size (e.g., 32 by 32). The state identification unit 33 may then input the resized object region into the feature calculation unit of the second classifier. This enables constant-size object regions to be inputted into the second classifier even if the size of a vehicle including target lights for identification of the states of lighting is changed in the images by a change in the relative distance between the vehicle 10 and the target vehicle during tracking of the vehicle. Thus the configuration of the second classifier is simplified.

Of the two state-of-lighting identification units, the state-of-lighting identification unit 402-1 is an example of the first state-of-lighting identification part and includes a recursive structure. The state-of-lighting identification unit 402-1 identifies the state of lighting of a direction indicator while updating an internal state that is recursively used by inputting the feature map calculated for each of the time-series images in chronological order. More specifically, the state-of-lighting identification unit 402-1 classifies the state of lighting of a direction indicator as one of four classes, i.e., left blinking, right blinking, hazard, and OFF, and outputs the result of classification. The direction indicator is an example of the first lighting part. The internal state of the state-of-lighting identification unit 402-1 is an example of the first internal state, and is stored in the memory 22. Whenever a feature map is inputted, the state-of-lighting identification unit 402-1 reads the latest internal state from the memory 22 and applies the internal state to operation of the state-of-lighting identification unit 402-1.

The state-of-lighting identification unit 402-2 is an example of the second state-of-lighting identification part and includes a recursive structure. The state-of-lighting identification unit 402-2 identifies the state of lighting of a rotating light while updating a second internal state that is recursively used by inputting the feature map calculated for each of the time-series images in chronological order. More specifically, the state-of-lighting identification unit 402-2 classifies the state of lighting of a rotating light as one of two classes, i.e., ON and OFF, and outputs the result of classification. In the case that a vehicle of interest does not include a rotating light, the state-of-lighting identification unit 402-2 is trained to output the result of identification, OFF, as the state of lighting of a rotating light. The rotating light is an example of the second lighting part. The internal state of the state-of-lighting identification unit 402-2 is an example of the second internal state, and is stored in the memory 22. Whenever a feature map is inputted, the state-of-lighting identification unit 402-2 reads the latest internal state from the memory 22 and applies the internal state to operation of the state-of-lighting identification unit 402-2. In this way, the separate state-of-lighting identification units identify the states of lighting of a direction indicator and a rotating light that have different outward appearances, which enables the classifier 400 to accurately identify the state of lighting of both the direction indicator and the rotating light.

Each of the state-of-lighting identification units 402-1 and 402-2 may be, for example, a neural network including a layer including a recursive structure, such as a recurrent neural network (RNN), a long short-term memory (LSTM), or a gated recurrent unit (GRU). Such a layer including a recursive structure will hereafter be referred to as a recursive operation layer 412. The recursive operation layer 412 updates the internal state whenever a feature map is inputted, and the internal state is referred to for identification of the state of lighting. In this way, features based on time-varying changes in outward appearances of lights depending on their states of lighting will be reflected in the internal state, which enables the state-of-lighting identification units 402-1 and 402-2 to accurately identify the states of lighting of a direction indicator and a rotating light, respectively. The recursive operation layers 412 included in the state-of-lighting identification unit 402-1 and 402-2 may have the same structure or different structures.

Each of the state-of-lighting identification units 402-1 and 402-2 may include one or more fully-connected layers closer to the output than the recursive operation layer 412. Each of the state-of-lighting identification units 402-1 and 402-2 further includes one or more output layers 413 that output the result of identification of the state of lighting by executing a softmax operation or a sigmoid operation on the output from the recursive operation layer 412 or the fully-connected layers. Thus the state identification unit 33 can identify the state of lighting of a direction indicator and a rotating light, based on the output from the output layers 413 of the state-of-lighting identification units 402-1 and 402-2.

The second classifier is also trained in advance in accordance with a predetermined training technique, such as backpropagation, with a large number of training images, similarly to the first classifier. The training images used for training the second classifier are given the states of lighting of individual lights provided on vehicles as annotation data. The first and second classifiers may be trained together by backpropagation with common training data.

The number of types of target lights for identification of the states of lighting may be three or more. In this case, the second classifier may include the above-described state-of-lighting identification unit for each light. Alternatively, one of state-of-lighting identification units included in the second classifier may be configured to identify the states of lighting of two or more lights. For example, the state-of-lighting identification unit 402-1 may be configured to identify the state of lighting of brake lights as well as that of a direction indicator. In this case, the state-of-lighting identification unit 402-1 classifies the state of lighting of brake lights as one of two classes, i.e., ON or OFF, and outputs the result of identification.

For each of the vehicles being tracked that are targets for identification of the state of lighting, the state identification unit 33 stores the results of identification of the states of lighting of individual lights provided on the vehicle in the memory 22 and outputs the results to the driving planning unit 34.

The driving planning unit 34 generates one or more planned trajectories of the vehicle 10 by referring to the detected-object list so that the vehicle 10 will not collide with objects around the vehicle 10. Each planned trajectory is represented as, for example, a set of target positions of the vehicle 10 at points in time from the current time to a predetermined time ahead thereof. For example, the driving planning unit 34 refers to the detected-object list to execute viewpoint transformation, using information such as the position at which the camera 2 is mounted on the vehicle 10, thereby transforming the image coordinates of the individual objects being tracked into coordinates in an aerial image ("aerial-image coordinates"). To this end, the driving planning unit 34 can estimate the position of an object being tracked at the time of acquisition of each image, using the position and orientation of the vehicle 10, an estimated distance to the object, and the direction from the vehicle 10 to the object at the time of acquisition of each image. The driving planning unit 34 can estimate the position and orientation of the vehicle 10 by comparing an image generated by the camera 2 with the high-precision map. For example, with an assumption about the position and orientation of the vehicle 10, the driving planning unit 34 projects features on or near the road detected from the image onto the high-precision map, or features on or near the road around the vehicle 10 represented in the high-precision map onto the image. The driving planning unit 34 then estimates the actual position and orientation of the vehicle 10 to be the position and orientation thereof for the case that the features detected from the image match those represented in the high-precision map the best. Additionally, the driving planning unit 34 can determine the direction from the vehicle 10 to an object being tracked, based on the position of the object region including the object in the image and the direction of the optical axis of the camera 2. Additionally, the driving planning unit 34 estimates the distance from the vehicle 10 to the object being tracked in accordance with a technique similar to that described in relation to the tracking unit 32.

The driving planning unit 34 executes a prediction process with, for example, a Kalman filter or a particle filter, on time-series aerial-image coordinates of an object being tracked to estimate a predicted trajectory of the object to a predetermined time ahead. In the case that the object being tracked is a vehicle traveling in an area around the vehicle 10, the driving planning unit 34 uses the results of identification of the states of lighting of individual lights of the vehicle for estimation of the predicted trajectory. For example, when the left direction indicator of a vehicle being tracked is in a blinking state, it is highly likely that the vehicle will make a lane change to the left or a left turn. Thus the driving planning unit 34 estimates a predicted trajectory such that the vehicle will make a lane change to the left or a left turn. When the brake lights of a vehicle being tracked are in an ON state or its hazard lights are in a blinking state, it is highly likely that the vehicle will decelerate. Thus the driving planning unit 34 estimates a predicted trajectory such that the vehicle will decelerate. Additionally, when neither the left and right turn signals nor the hazard lights of a vehicle being tracked are in a blinking state and its brake lights are in an OFF state, it is highly likely that the vehicle will travel straight without deceleration. Thus the driving planning unit 34 estimates a predicted trajectory such that the vehicle will travel straight without deceleration.

The driving planning unit 34 generates a planned trajectory of the vehicle 10, based on the predicted trajectories of the objects being tracked as well as the position, speed, and orientation of the vehicle 10, so that a predicted distance between the vehicle 10 and any of the objects will not be less than a predetermined distance until a predetermined time ahead.

When the state of lighting of a rotating light of a tracked vehicle detected from time-series images obtained by a camera to capture a region behind the vehicle 10 is ON, the vehicle is assumed to be an emergency vehicle. Thus the driving planning unit 34 may generate a planned trajectory so that the vehicle 10 will not obstruct the predicted trajectory of the vehicle having a rotating light whose state of lighting is ON. For example, when the state of lighting of a rotating light of a vehicle behind the vehicle 10 on the lane where the vehicle 10 is traveling is ON, the driving planning unit 34 may generate a planned trajectory so that the vehicle 10 will make a lane change to an adjoining lane or road shoulder.

The driving planning unit 34 notifies the vehicle control unit 35 of the generated planned trajectory.

The vehicle control unit 35 controls components of the vehicle 10 so that the vehicle 10 will travel along the notified planned trajectory. For example, the vehicle control unit 35 determines the acceleration of the vehicle 10 according to the notified planned trajectory and the current speed of the vehicle 10 measured by a vehicle speed sensor (not illustrated), and sets the degree of accelerator opening or the amount of braking so that the acceleration of the vehicle 10 will be equal to the determined acceleration. The vehicle control unit 35 then determines the amount of fuel injection according to the set degree of accelerator opening, and outputs a control signal depending on the amount of fuel injection to a fuel injector of the engine of the vehicle 10. Alternatively, the vehicle control unit 35 determines the electric power to be supplied to a motor according to the set degree of accelerator opening, and controls a driving circuit of the motor so that the determined electric power will be supplied to the motor. Alternatively, the vehicle control unit 35 outputs a control signal depending on the set amount of braking to the brake of the vehicle 10.

When the direction of the vehicle 10 is changed in order for the vehicle 10 to travel along the planned trajectory, the vehicle control unit 35 determines the steering angle of the vehicle 10 according to the planned trajectory. The vehicle control unit 35 then outputs a control signal depending on the steering angle to an actuator (not illustrated) that controls the steering wheel of the vehicle 10.

FIG. 5 is an operation flowchart of the vehicle control process including the state-of-lighting identification process and executed by the processor 23. The processor 23 executes the vehicle control process in accordance with the operation flowchart illustrated in FIG. 5 at predetermined intervals. In the operation flowchart described below, the process of steps S101 to S104 corresponds to the state-of-lighting identification process.

The object detection unit 31 of the processor 23 inputs the latest image obtained from the camera 2 into the first classifier to detect one or more detection target objects represented in the image. In other words, the object detection unit 31 detects one or more object regions respectively including the detection target objects in the image (step S101). The object detection unit 31 further identifies the types of the respective objects.

For each object region in the latest image, the tracking unit 32 of the processor 23 tracks the object represented in the object region by associating the object with the same object that has been detected from a past image (step S102).

For another traveling vehicle around the vehicle 10 among the objects being tracked, the state identification unit 33 of the processor 23 inputs an object region detected from the latest image and including the traveling vehicle into the second classifier. The feature calculation unit of the second classifier then calculates feature maps (step S103). The individual state-of-lighting identification units provided for the second classifier and each including a recursive structure identify the states of lighting of individual lights of the vehicle, based on the feature maps (step S104).

The driving planning unit 34 of the processor 23 determines predicted trajectories of the respective objects being tracked, and generates a planned trajectory of the vehicle 10 so that the vehicle 10 will be separated more than a predetermined distance from any of the predicted trajectories (step S105). To this end, the driving planning unit 34 determines predicted trajectories of another traveling vehicle around the vehicle 10 among the objects being tracked by referring to the states of lighting of individual lights of the traveling vehicle. The vehicle control unit 35 of the processor 23 then controls the vehicle 10 so that the vehicle 10 will travel along the planned trajectory (step S106). The processor 23 then terminates the vehicle control process.

As has been described above, the apparatus for identifying the state of lighting uses a single classifier for identifying the states of lighting of multiple lights of a vehicle represented in time-series images. The classifier includes a common feature calculation unit that is prepared for the lights and that calculates feature maps; and two or more state-of-lighting identification units prepared separately for different types of lights and each including a recursive structure. In this way, the apparatus uses the common feature calculation unit prepared for the lights to prevent the configuration of the classifier from upsizing, thereby enabling reduction in the amount of computation. Additionally, the apparatus includes in the classifier the separate units for identifying the states of lighting of the individual lights on the basis of the calculated common feature maps, thereby enabling accurate identification of the states of lighting of the individual lights.

According to a modified example, the state identification unit 33 may input object regions of multiple vehicles being tracked into the second classifier in parallel to identify the states of lighting of the lights of these vehicles in parallel. For example, in the case that the vehicle 10 is provided with multiple cameras, the state identification unit 33 inputs, for each camera, object regions of tracked vehicles detected from time-series images generated by the camera into the second classifier in parallel. This enables the state identification unit 33 to identify the states of lighting of the lights of the vehicles being tracked in parallel for each camera. Thus, for example, the state identification unit 33 can identify the state of lighting of a direction indicator or brake lights of a leading vehicle traveling ahead of the vehicle 10 and that of a rotating light of an emergency vehicle traveling behind the vehicle 10. In the case that multiple vehicles are detected from time-series images obtained by one of multiple cameras and are tracked, the state identification unit 33 may input object regions of vehicles detected from images obtained by this camera into the second classifier in parallel. In particular, in some cases, the processor 23 includes an operating circuit intended for executing operations of the second classifier, e.g., convolution operations, and the size of data that can be simultaneously inputted into the operating circuit is two or more times larger than the data size of a single object region. In such a case, the state identification unit 33 can identify the states of lighting of lights of multiple vehicles in a short time by the operating circuit executing the processing of the second classifier regarding the vehicles in parallel as described above. The state identification unit 33 may input multiple object regions into the second classifier in parallel as input into different channels or with the individual object regions arranged spatially in parallel in the same channel.

According to another modified example, the first and second classifiers may be partially integrated. In this case, convolution layers of the first classifier serve as a feature calculation unit of a classifier for identifying the states of lighting of individual lights of a vehicle. Of the feature maps calculated by the convolution layers of the first classifier, only portions calculated from object regions representing vehicles being tracked are inputted into the state-of-lighting identification units of the second classifier. Thus, in this modified example, the feature calculation unit of the second classifier is omitted, which reduces computational burden of the processor 23.

The apparatus for identifying the state of lighting according to the embodiment or modified examples may be mounted on a device other than vehicle-mounted equipment. For example, the apparatus according to the embodiment or modified examples may be configured to detect a vehicle from an image generated by a surveillance camera placed for capturing a predetermined region at predetermined intervals and to identify the states of individual lights provided on the detected vehicle.

The computer program for achieving the functions of the units of the processor 23 of the apparatus for identifying the state of lighting according to the embodiment or modified examples may be provided in a form recorded on a computer-readable and portable medium, such as a semiconductor memory, a magnetic medium, or an optical medium.

As described above, those skilled in the art may make various modifications according to embodiments within the scope of the present invention.

What is claimed is:

1. An apparatus for identifying the state of lighting, comprising
a processor configured to identify the states of lighting of a first lighting part and a second lighting part of a vehicle that is moving by inputting time-series images representing the vehicle that is moving into a classifier, the classifier comprising:
a feature calculation part configured to calculate, whenever one of the time-series images is inputted in chronological order, a feature map representing features of the first lighting part and the second lighting part by executing a convolution operation on the inputted image;
a first state-of-lighting identification part including a recursive structure and configured to identify the state of lighting of the first lighting part while updating a first internal state that is recursively used by inputting the feature map calculated for each of the time-series images in chronological order; and
a second state-of-lighting identification part including a recursive structure and configured to identify the state of lighting of the second lighting part while updating a second internal state that is recursively used by inputting the feature map calculated for each of the time-series images in chronological order, wherein the first lighting part is a direction indicator, and the second lighting part is a rotating light, wherein
the processor is further configured to:
detect an object region representing the vehicle that is moving from each of the time-series images; and
track the vehicle that is moving to associate object regions representing the vehicle that is moving in the respective time-series images with each other, and
the processor inputs the object regions representing the vehicle that is moving in the respective time-series images into the classifier.

2. A method for identifying the state of lighting, comprising:
identifying the states of lighting of a first lighting part and a second lighting part of a vehicle that is moving by inputting time-series images representing the vehicle that is moving into a classifier comprising a feature calculation part, a first state-of-lighting identification part including a recursive structure, and a second state-of-lighting identification part including a recursive structure, wherein the feature calculation part of the classifier calculates, whenever one of the time-series images is inputted in chronological order, a feature map representing features of the first lighting part and the second lighting part by executing a convolution operation on the inputted image,
the first state-of-lighting identification part of the classifier identifies the state of lighting of the first lighting part while updating a first internal state that is recursively used by inputting the feature map calculated for each of the time-series images in chronological order,
the second state-of-lighting identification part of the classifier identifies the state of lighting of the second lighting part while updating a second internal state that is recursively used by inputting the feature map calculated for each of the time-series images in chronological order, wherein the first lighting part is a direction indicator, and the second lighting part is a rotating light, and
the method further comprises:
detecting an object region representing the vehicle that is moving from each of the time-series images;
tracking the vehicle that is moving to associate object regions representing the vehicle that is moving in the respective time-series images with each other; and
inputting the object regions representing the vehicle that is moving in the respective time-series images into the classifier.

3. A non-transitory recording medium that stores a computer program for identifying the state of lighting, the computer program causing a computer to execute a process comprising:
identifying the states of lighting of a first lighting part and a second lighting part of a vehicle that is moving by inputting time-series images representing the vehicle that is moving into a classifier comprising a feature calculation part, a first state-of-lighting identification part including a recursive structure, and a second state-of-lighting identification part including a recursive structure, wherein
the feature calculation part of the classifier calculates, whenever one of the time-series images is inputted in chronological order, a feature map representing features of the first lighting part and the second lighting part by executing a convolution operation on the inputted image,
the first state-of-lighting identification part of the classifier identifies the state of lighting of the first lighting part while updating a first internal state that is recursively used by inputting the feature map calculated for each of the time-series images in chronological order, and
the second state-of-lighting identification part of the classifier identifies the state of lighting of the second lighting part while updating a second internal state that is recursively used by inputting the feature map calculated for each of the time-series images in chronological order, wherein the first lighting part is a direction indicator, and the second lighting part is a rotating light, and
the computer program causes the computer to further execute:
detecting an object region representing the vehicle that is moving from each of the time-series images;
tracking the vehicle that is moving to associate object regions representing the vehicle that is moving in the respective time-series images with each other; and inputting the object regions representing the vehicle that is moving in the respective time-series images into the classifier.

* * * * *